Figure 1:
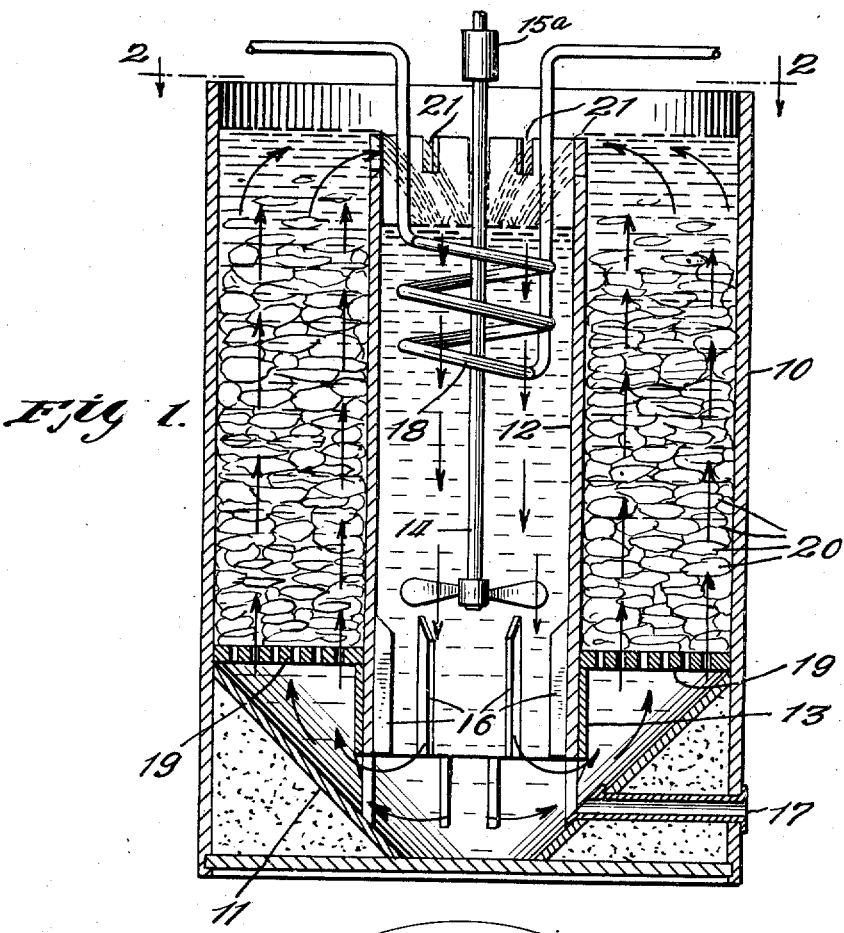

March 22, 1938.   G. PLEWS   2,111,726

METHOD OF PRODUCING IRON OXIDE PIGMENTS

Original Filed July 27, 1932

INVENTOR
George Plews
BY
ATTORNEYS

Patented Mar. 22, 1938

2,111,726

UNITED STATES PATENT OFFICE 2,111,726

METHOD OF PRODUCING IRON OXIDE PIGMENTS

George Plews, Berkeley, Calif., assignor to C. K. Williams & Co., Easton, Pa., a corporation of Pennsylvania Application July 27, 1932, Serial No. 624,987
Renewed May 14, 1937

25 Claims. (Cl. 134—59)

This invention relates to the production of iron oxide for the manufacture of pigments by the oxidation of metallic iron, and has for its object the improvement in the quality, color and purity of the iron oxide brought about by limiting the initial rate of oxidation of the iron and the rate of subsequent oxidation of ferrous to ferric oxide.

The process provides an iron oxide pigment which is substantially free from adulerants and products of no pigment value (particularly calcium sulphur which has been the principal contaminating material in prior iron oxide pigments), and which can be produced in lighter shades of yellows than is possible by the prior methods of producing iron oxide pigments.

In the prior practice of producing these pigments, it has been customary to produce the iron oxide in the presence of a ferrous sulphur solution, by the use of a limited amount of metallic iron and a copious supply of oxygen which is blown through the solution thereby to oxidize the ferrous sulphur to ferric sulphur, which ferric sulphur is in turn reduced by the metallic iron present to ferrous sulphur, forming a cyclic process for the production of iron oxide from the metallic iron. In order to control the structure of the iron oxide particles and to prevent a crystalline formation thereof which is undesirable for pigment properties, it is necessary according to the prior practice to use a starter solution of colloidal ferric hydrate, produced by precipitating ferrous hydrate from ferrous sulphur by the use of lime and then oxidizing the ferrous hydrate to ferric hydrate. The use of a starter solution prepared in this way introduces into the final pigment insoluble calcium sulphur in amounts often as high as 12% to 15% of the iron oxide content of the pigment. This inert and substantially insoluble calcium sulphur is detrimental to the quality and color of the final iron oxide pigment.

I have discovered that the copious use of oxygen by means of air blown through the iron salt solution is unnecessary and that a final product of superior quality and color can be produced by the use of a limited amount of oxygen which causes slow oxidation of the iron to ferric oxide.

I have also discovered that better color can be produced in the final pigment if the oxidation of ferrous sulphur to ferric sulphur as directed in the previous processes is substantially completely avoided. Hence, in practice of the present invention, contact of the ferrous sulphur solution with oxygen is restricted to such degree as will avoid any appreciable oxidation of the ferrous sulphur. The acidity of the solution is thus maintained at a low value, and should be maintained preferably between the pH values 3.2 and 3.6.

In order to compensate for the reduced rate of oxidation of the individual iron particles in my process, I have found it desirable to increase the normal amount of metallic iron present in the solution so that although a slow rate of oxidation of the individual iron particles is maintained, thereby improving the range of colors toward the light yellow oxides, the greater amount of iron present permits a high average rate of corrosion and does not reduce the final yield of the desired product.

In order to control and limit the rate of oxidation, it is necessary to control and to limit the quantity of oxygen dissolved in the solution in which the iron is oxidized. Ferrous sulphur in circulation can of itself absorb oxygen from the air at such a rapid rate as to produce oxidation of the iron more rapidly than desired in my preferred practice. This results in a large grain structure for the ferric oxide and inferior color values tending toward brown and red colors.

In my preferred oxidation procedure, by depending upon absorption of oxygen from the atmosphere, I limit the amount of oxygen dissolved in the iron salt solution by adjustment of the mobility and of the rate of flow or circulation of the iron salt solution past the metallic iron particles and in contact with the atmosphere to thereby bring within ready control the rate of oxidation of the metallic iron particles. The quantity of oxygen dissolved and the mobility or rate of flow of the iron salt solution can be reduced in many ways. The presence of a second soluble sulphur, as for example, sodium sulphur, in the ferrous sulphur solution will materially reduce the solubility of oxygen in the ferrous sulphur. The presence of a gelatinous material of low mobility or high viscosity will also limit the oxygen solubility and permit control of the rate of flow of the iron salt solution over the metallic iron particles while the salt solution is kept in controlled circulation by means of a propeller, pump, or other suitable agitation and flow control device.

It has, however, been found extremely important for best results that the circulation of the salt solution be effected in an evenly flowing stream without violent disturbance or agitation of any part of the flowing mass. The propeller means hereinafter described has in practice proved far superior to other known circulating devices of the nature of pumps, paddles, inert-gas jets and the like.

I have found that the mobility and oxygen solubility of the ferrous salt solution in which the metallic iron particles are placed for the purpose of oxidation may be controlled in several ways, as for example,—

1. By the use of an alkali metal hydroxide such as sodium, potassium, or ammonium hydroxide, etc., which precipitates from the soluble ferrous salt a highly dispersed gelatinous suspension of ferrous hydroxide capable of being oxidized to produce a gelatinous, highly dispersed suspension of ferric hydroxide of high consistency. This latter material is particularly suitable as an oxidation control medium for the iron oxide particles, controlling the form of the ferric oxide precipitated during the oxidation reaction.

2. By the addition of alkali metal hydroxides, such as sodium, potassium, or ammonium hydroxide, etc., together with alkali earth oxides or hydroxides, such as calcium oxide, or hydroxide, which mixture causes the precipitation from the soluble ferrous salt of a highly dispersed gelatinous suspension of ferrous hydrate capable of being oxidized under controlled conditions to produce a gelatinous suspension of hydrated hydrous ferric oxide of high consistency and low oxygen solubility.

3. By the addition of easily saponifiable oils, fats, or waxes to alkali metal hydroxides, such as sodium, potassium, ammonium hydroxide, etc., for the precipitation of ferrous hydroxide from the soluble ferrous salts, which ferrous hydroxide thus produced can be oxidized under controlled conditions to a gelatinous suspension of ferric oxide of high consistency, low mobility and low oxygen solubility.

4. By the addition of a highly dispersed, finely divided inert material free of objectionable color, such as clays, bentonite clays, etc., to the soluble ferrous salt such as ferrous sulphur so as to eliminate the step of producing a preliminary starter solution, and at the same time to reduce and limit the oxygen solubility of the ferrous salt solution and decrease the mobility of the solution to permit ready control of the rate of oxidation of the iron particles.

In one method of operating my process with the use of a fixed alkali hydroxide alone for preparing the starting pulp, I take ferrous sulphur, say 3400 pounds, and about 800 pounds of sodium hydroxide, which with the amount of ferrous sulphur stated will produce approximately 1400 pounds of sodium sulphur in solution and a corresponding amount of ferrous hydrate, roughly one thousand seventy-two (1,072) pounds. This precipitate is produced preferably at room temperature. With the amounts of ferrous sulphur and sodium hydroxide mentioned, I use water enough to make about 3000 gallons of pulp, but this amount may be varied considerably. The resulting mass, of a rather gelatinous consistency, is now under controlled conditions, agitated in the presence of air so that the oxygen needed for oxidation of the ferrous hydrate to ferric hydrate will be taken up by the pulp by absorption from the air. This agitation and absorption of oxygen may be conveniently effected in an apparatus of the type hereinafter described in which, however, no metallic iron is present during the preliminary clarification stage.

When an alkali earth hydroxide and a fixed alkali hydroxide, such as hydrated lime and caustic soda are used together to precipitate the initial ferrous hydrate, satisfactory results have been obtained with a mixture of soap and hydroxides, which mixture may be produced by dissolving 100 to 200 pounds of sodium hydroxide (caustic soda) in 400 to 600 gallons of water and mixing in the solution about 5 pounds of cocoanut oil and 700 to 800 pounds of slacked lime. The mixture is then added to a solution consisting satisfactorily of about 3400 pounds of ferrous sulphur in 2400 gallons of water.

When the color of the starting precipitate has been converted to yellow by slow oxidation (which usually requires about 24 hours) the pulp is diluted to about 5,000 gallons and transferred to a larger apparatus, in which it is passed over metallic iron (preferably mild steel in the form of scrap), the circulation being effected mechanically by means of a propeller or other flow control or circulating device, with absorption of oxygen from the air at the surface of the pulp. This operation is conducted preferably at 145° F. and the oxygen absorption is kept low enough to prevent the objectionable browning and coarsening due to too rapid oxidation above referred to. During this stage a layer of hydrated oxide which may be from $\frac{1}{16}''$ to $\frac{1}{8}''$ thick and ranging from a pale green color at the iron surface to a yellow color on the outside is formed on the iron.

The simplest method of keeping the oxygen absorption down to a safe rate is by regulation of the speed of circulation, starting with a slow rate and increasing it until by observation of the consistency of the pulp, the paling of the color to a cream shade, and the circulation speed at which a brownish cast begins to appear or fails to disappear, a safe rate is found. Usually from about three to four days treatment is required to bring the material to the shade mentioned. In this stage as in the first the oxidation of ferrous sulphur is deleterious and it is for this reason that the oxygen absorption is kept down by regulating the circulation rate, especially when there is no sodium sulphur or similar soluble sulphur present in the pulp, to avoid a brownish cast in the oxidized initial precipitate and in the hydrated ferric oxide produced by oxidation of hydrated ferrous oxide formed on the iron.

As the operation proceeds the color of the material deepens, becoming yellower and yellower and also brighter. Before the desired shade is reached, the pulp may get too thick, slowing up too much the absorption of oxygen and corrosion of the iron, or requiring an excessive amount of power to propel the pulp over the iron. In such case the pulp may be diluted as by dividing it up in separate apparatus and adding fresh sulphur solution as described above, with the circulation adjusted to a lower rate to suit the greater mobility of the pulp. Such dilution may be resorted to as often as necessary or desirable to keep the process going at an efficient rate of yield.

While I prefer a starting pulp in which the suspended solid material is composed entirely of ferrous hydrate, the solid material may be composed wholly or partly of finely divided inert or harmless material, such as bentonite or other clay, in an amount sufficient to give the desired consistency and mobility. The plasticity of such material closely resembles in effect the more or less gelatinous nature of a starter prepared with a fixed alkali hydroxide. I have found that for a 5½ per cent. ferrous sulphur solution good results can be obtained with an addition of bentonite to the amount of about 15 per cent. of the dissolved ferrous sulphur.

When the solution reaches the desired color, further circulation of the solution over the iron is stopped, the solution being withdrawn from the corrosion tank and the ferric oxide filtered therefrom, which oxide is then either washed and dried to produce the desired yellow pigment, or is calcined to produce deeper shades of red pigments.

In the preferred practice of my process, I use an apparatus in which the ferrous salt solution which acts as the oxygen carrier may be circulated over or through a mass of metallic iron particles and in which the rate of flow and the exposure of the salt solution to the air or oxidizing influence may be readily controlled to limit the rate of absorption of oxygen from the air and the rate of oxidation of the iron particles.

Figure 1 of the drawing shows in sectional view a preferred embodiment of apparatus for practicing my process.

Figure 2:
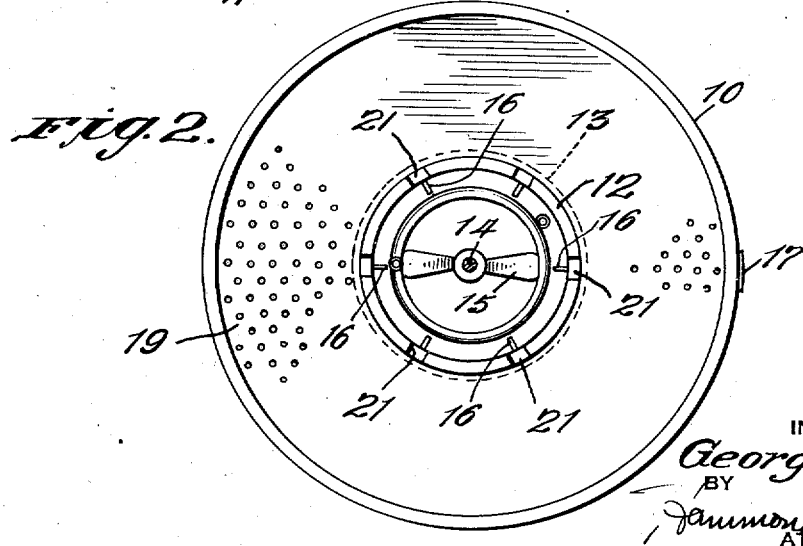

Figure 2 is a plan view on line 2—2 of the empty apparatus shown in Figure 1.

In the form of embodiment of apparatus shown, an outer vessel or tank 10 is provided having a conical bottom 11 on which the inner vessel or tube 12 opens at the top and bottom and is supported by means of brackets 13. An agitation and circulation device, such as a propeller or pump 15, is provided preferably in the inner vessel, and is rotated by means of a shaft 14 driven through a suitable change speed mechanism indicated at 15a which may be of a continuously variable type to permit regulation of the circulation rate as desired. The inner vessel at its bottom may be equipped with a number of baffles, such as 16, to break up the swirling effect of the solution produced by the propeller.

A discharge opening 17 is provided having a removable closure, not shown. Heating coils 18 may be provided through which steam, hot water, or other suitable heating medium may be passed to heat the treating solution. The metallic iron particles 20 consisting preferably of sheet steel are preferably supported on a false bottom 19 removably mounted on the brackets 13. The rotation of the propeller is preferably in the direction to produce downward flow of the solution in the inner vessel and upward flow around the particles in the outer vessel. Slots may be provided at the upper edge of the inner vessel as indicated at 21 to form a weir for dividing the solution cascading over the edge of the inner vessel to thereby increase or decrease the surface exposure to the air and consequently control the absorption of oxygen from the air.

It is to be understood, however, that the arrangement of apparatus described is suggestive only and that any other suitable design or arrangement might be used in which the salt solution may be circulated at a controlled rate over or through the metallic iron particles and at some point in the circulation be exposed to the absorption of oxygen from the air, thereby to convey the oxygen to the metallic iron particles to control the rate of oxidation thereof.

It is also to be understood that the mobility and the rate of oxygen absorption of the ferrous salt solution may be controlled in many ways other than those specifically described above.

I claim:

1. In the manufacture of iron oxide for pigment purposes, the method of controlling the rate of oxidation and the structure of the iron oxide particles, which comprises circulating a solution of ferrous sulphur over metallic iron particles out of contact with the atmosphere, absorbing oxygen in the solution, controlling the rate of oxidation of the iron by adjusting the mobility of the solution and the rate of circulation of said solution over the iron, the greater or lesser the mobility, the lesser or greater, respectively, the rate of circulation, whereby the color and structure of the iron oxide produced is controlled.

2. The method of manufacturing iron oxide for pigment purposes from metallic iron which comprises circulating a heated ferrous sulphur solution over metallic iron particles, exposing the said sulphur salt solution to the absorption of oxygen only from the air in contact with the surface of the solution and entrained therefrom, and maintaining a low rate of oxygen absorption and rate of oxidation by adjustment of the mobility of the solution and rate of circulation, said adjustment involving increasing and decreasing the rate of circulation in accordance with the decrease and increase, respectively, of the mobility of the solution.

3. The method of manufacturing iron oxide pigment from metallic iron which comprises producing a solution containing ferrous sulphur which solution is of high viscosity, low mobility and low oxygen solubility, exposing said solution only to atmospheric oxygen taken up through the surface of the solution and circulating said solution over submerged metallic iron particles and in contact with the atmosphere at a speed adapted to absorb therefrom an amount of oxygen adapted to obtain a slow rate of oxidation of the iron.

4. The method of oxidizing iron for the production of pigments comprising passing over metallic iron a heated ferrous sulphur solution containing dissolved oxygen in an insufficient quantity to oxidize any appreciable quantity of said salt, but sufficient to oxidize said iron to ferric hydrate.

5. The method of oxidizing iron for the production of pigments comprising lowering the oxygen solubility of a solution of ferrous sulphur, heating said solution, circulating said solution over metallic iron and causing said solution to dissolve oxygen in an amount insufficient to permit material oxidation of said sulphur salt.

6. Method of preparing a starting material adapted for use in a process of making iron oxide pigment directly from metallic iron, comprising precipitating a ferrous hydrate from ferrous sulphur solution in excess by means of a precipitant consisting at least in part of an alkali metal hydroxide, converting the precipitate to a ferric hydrate of yellow color by subjecting the same to slow oxidation by oxygen supplied only from the atmosphere in contact with the surface of the solution, while maintaining the rate of absorption of oxygen by the solution at a rate sufficiently slow to produce a mass of gelatinous consistency, low mobility, fine particle size, and yellow in color free of objectionable brownish color.

7. A method as described in claim 6, in which the ferrous salt solution containing the ferrous hydrate which is subjected to oxidation is a solution of ferrous sulphur containing sodium sulphur.

8. Process for making iron oxide pigment directly from metallic iron, comprising mechanically circulating a suspension of finely divided clay free of color which alters the appearance of the final iron oxide pigment obtained in a liquor containing ferrous sulphur in solution in contact with iron and with sufficient atmospheric oxygen in another part of the cycle to oxidize ferrous hydrate substantially as fast as formed without material oxidation of the ferrous sulphur.

9. Process for making iron oxide pigment directly from metallic iron, comprising establishing in connected chambers, one of which contains metallic iron, a suspension of ferric hydrate in a liquor containing ferrous sulphur in solution, and mechanically circulating the liquor and suspended hydrate through the chambers while supplying atmospheric oxygen to the liquor in amount sufficient to oxidize ferrous hydrate substantially as fast as formed without material oxidation of the ferrous salt.

10. Process for making iron oxide pigment from metallic iron, comprising establishing a suspension of ferric hydrate in a liquor containing dissolved ferrous sulphur, in an outer chamber containing metallic iron and an inner chamber communicating with the outer at top and bottom, mechanically and continuously propelling the liquor and suspended hydrate through the chambers and through the iron in the outer chamber for corrosion of the iron and precipitation of hydrated ferric oxide of fine particle size and clear yellow in color, and causing the liquor in its flow from one chamber to the other to absorb atmospheric oxygen in amount regulated to prevent oxidation of the ferrous salt to an extent causing a brownish cast in the precipitated hydrate.

11. Process for making iron oxide pigment from metallic iron, comprising establishing in an outer chamber containing metallic iron and an inner chamber communicating with the outer at top and bottom, a suspension of yellow ferric hydrate in a liquor containing ferrous sulphur and sodium sulphur in solution, mechanically and continuously circulating the mass downwardly through the inner chamber into the outer and upwardly through the latter and the iron therein into the inner chamber, and causing the liquor in its flow from the outer to the inner chamber to absorb atmospheric oxygen in amount regulated to maintain low mobility of the mass and prevent substantial oxidation of ferrous sulphur.

12. Process for making iron oxide pigment from metallic iron, comprising establishing a suspension of yellow ferric hydrate in a liquor containing ferrous and sodium sulphurs in solution and in which metallic iron is immersed; circulating the liquor and suspended hydrate over the iron while supplying sufficient oxygen to the liquor by absorption from the atmosphere to oxidize hydrated ferrous oxide without substantial oxidation of ferrous sulphur; increasing the circulation rate as mobility decreases and increasing the mobility of the mass with an increase in circulation rate to produce a high corrosion rate with production of a yellow precipitate of oxidized hydrate free from brownish cast or discoloration.

13. Process for making iron oxide pigment from metallic iron, comprising establishing in connected chambers, one of which contains metallic iron, a pulp comprising a suspension of yellow ferric hydrate in a liquor containing ferrous sulphur and sodium sulphur in solution; mechanically circulating the pulp through the chambers while supplying oxygen to the liquor by absorption from the atmosphere, whereby the iron is corroded with production of ferrous hydrate and the latter is oxidized to ferric hydrate; increasing the circulation rate of the pulp as mobility decreases, and from time to time increasing the mobility of the pulp by dilution with ferrous sulphur solution as the mobility decreases, to maintain rapid corrosion of the iron without causing a brownish cast or discoloration in the oxidation product.

14. Process as described in claim 8, in which the suspended finely divided clay is at least in part bentonite.

15. Process as described in claim 21, in which the suspended finely divided clay is at least in part bentonite.

16. In a process for making iron oxide pigment directly from iron, precipitating ferrous hydrate from ferrous sulphur solution in excess by a precipitant consisting of an alkaline earth metal hydroxide and an alkali metal hydroxide with the addition of soap, oxidizing the precipitate to a yellow color, passing the mass over metallic iron, and supplying atmospheric oxygen to the flowing mass.

17. In a process for making iron oxide pigment directly from iron, precipitating ferrous hydrate from ferrous sulphur solution in excess by a precipitant consisting at least in part of an alkali metal hydroxide, oxidizing the precipitate to yellow color, repeatedly passing the mass over metallic iron, and contacting the flowing mass with oxygen contained in atmosphere whereby oxygen is taken up at a rate which oxidizes ferrous hydrate substantially as fast as formed without material oxidation of the ferrous sulphur.

18. A process as described in claim 17, using sodium hydroxide as the alkali metal hydroxide.

19. A process as described in claim 17, in which the precipitant comprises an alkaline earth hydroxide and an alkali metal hydroxide.

20. Process for making iron oxide pigment directly from metallic iron, comprising precipitating a ferrous hydrate from ferrous sulphur solution in excess by means of a precipitant consisting at least in part of an alkali metal hydroxide, subjecting the precipitate to slow oxidation in the mother liquor by agitating the same with addition of oxygen until the color of the precipitate is changed to yellow, thinning the mass, repeatedly passing the thinned mass over metallic iron, and contacting the circulating mass with air whereby oxygen is taken up at a rate to give a slow oxidation adapted to yield a product free of objectionable browning and fine in particle size, said oxidation also being caused to occur at a rate which oxidizes ferrous hydrate substantially as fast as formed without material oxidation of the ferrous sulphur.

21. Process for making iron oxide pigment from metallic iron, comprising establishing a suspension of finely divided clay in a liquor containing in solution ferrous sulphur and sodium sulphur adapted to impede the oxidation of ferrous sulphur, circulating the liquor and suspended material over metallic iron, and causing the circulating mass to take up oxygen at a rate which oxidizes ferrous hydrate substantially as fast as formed without material oxidation of the ferrous sulphur.

22. Process for making iron oxide pigment from metallic iron, comprising establishing a suspension of ferric hydrate in a liquor containing in solution ferrous sulphur and sodium sulphur adapted to impede the oxidation of ferrous sulphur, circulating the liquor and suspended hydrate over metallic iron, and contacting the circulating mass with air whereby oxygen is taken up at a rate which oxidizes ferrous hydrate substantially as fast as formed without material oxidation of the ferrous sulphur.

23. The process of manufacturing iron oxide pigment comprising preparing a liquor containing in solution ferrous sulphur and in suspension a finely divided clay free of any color which prevents the final pigment from having the desired shade, circulating said liquor in an even stream without violent agitation of any part of the flowing mass over metallic iron and in another part of the cycle in contact with oxygen, said oxygen being taken up in such a manner that the amount absorbed is insufficient to lessen the quantity of ferrous sulphur by oxidation into ferric sulphur but sufficient to oxidize the ferrous hydrate as fast as formed.

24. In the preparation of iron oxide from iron, ferrous sulphur solution and oxygen wherein the solution is circulated over the iron in one part of the cycle and in contact with oxygen in another part of the cycle, the step of propelling said solution into repeated contact with the iron and oxygen in such manner that the oxygen is taken up at a rate at which the ferrous hydrate is oxidized substantially as fast as formed without material oxidation of the ferrous sulphur, said propelling action being without violent agitation of any part of the solution whereby a superior product is obtained therefrom.

25. In the production of iron oxide pigments from ferrous sulphur solution by circulating said solution through a cycle including contacting with iron in one part of the cycle and with oxygen in another part of the cycle the improvement comprising applying oxygen to said circulating solution only by contact with oxygen in the atmosphere absorbed and entrained from the surface of the solution, the oxygen being absorbed and entrained at a rate which oxidizes ferrous hydrate substantially as fast as formed without material oxidation of the ferrous sulphur.

GEORGE PLEWS.

CERTIFICATE OF CORRECTION.

Patent No. 2,111,726. March 22, 1938.

GEORGE PLEWS.

It is hereby certified that error appears in the above numbered patent requiring correction as follows: Throughout the specification and claims, for the word "sulphur" read sulfate; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.

culating mass with air whereby oxygen is taken up at a rate which oxidizes ferrous hydrate substantially as fast as formed without material oxidation of the ferrous sulphur.

23. The process of manufacturing iron oxide pigment comprising preparing a liquor containing in solution ferrous sulphur and in suspension a finely divided clay free of any color which prevents the final pigment from having the desired shade, circulating said liquor in an even stream without violent agitation of any part of the flowing mass over metallic iron and in another part of the cycle in contact with oxygen, said oxygen being taken up in such a manner that the amount absorbed is insufficient to lessen the quantity of ferrous sulphur by oxidation into ferric sulphur but sufficient to oxidize the ferrous hydrate as fast as formed.

24. In the preparation of iron oxide from iron, ferrous sulphur solution and oxygen wherein the solution is circulated over the iron in one part of the cycle and in contact with oxygen in another part of the cycle, the step of propelling said solution into repeated contact with the iron and oxygen in such manner that the oxygen is taken up at a rate at which the ferrous hydrate is oxidized substantially as fast as formed without material oxidation of the ferrous sulphur, said propelling action being without violent agitation of any part of the solution whereby a superior product is obtained therefrom.

25. In the production of iron oxide pigments from ferrous sulphur solution by circulating said solution through a cycle including contacting with iron in one part of the cycle and with oxygen in another part of the cycle the improvement comprising applying oxygen to said circulating solution only by contact with oxygen in the atmosphere absorbed and entrained from the surface of the solution, the oxygen being absorbed and entrained at a rate which oxidizes ferrous hydrate substantially as fast as formed without material oxidation of the ferrous sulphur.

GEORGE PLEWS.

CERTIFICATE OF CORRECTION.

Patent No. 2,111,726.　　　　　　　　　　　　　March 22, 1938.

GEORGE PLEWS.

It is hereby certified that error appears in the above numbered patent requiring correction as follows: Throughout the specification and claims, for the word "sulphur" read sulfate; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.

CERTIFICATE OF CORRECTION.

Patent No. 2,111,726. March 22, 1938.

GEORGE PLEWS.

It is hereby certified that error appears in the above numbered patent requiring correction as follows: Throughout the specification and claims, for the word "sulphur" read sulfate; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.